(12) United States Patent
Guo

(10) Patent No.: US 11,703,989 B1
(45) Date of Patent: Jul. 18, 2023

(54) END-USER CREATED CROPPED APPLICATION WINDOW

(71) Applicant: Microsoft Technology Licensing, LLC, Redmond, WA (US)

(72) Inventor: Kevin Guo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,051

(22) Filed: May 25, 2022

(51) Int. Cl.
*G06F 3/0481* (2022.01)
*G06F 3/04845* (2022.01)

(52) U.S. Cl.
CPC ........ *G06F 3/0481* (2013.01); *G06F 3/04845* (2013.01)

(58) Field of Classification Search
CPC ............................ G06F 3/0481; G06F 3/04845
See application file for complete search history.

(56) References Cited

U.S. PATENT DOCUMENTS

| 5,841,434 | A |   | 11/1998 | Arda et al. |  |
|---|---|---|---|---|---|
| 2007/0106952 | A1 |   | 5/2007 | Matas et al. |  |
| 2007/0162865 | A1 | * | 7/2007 | Haynes | G06F 3/0481 715/806 |
| 2009/0164936 | A1 | * | 6/2009 | Kawaguchi | G06F 3/0481 715/788 |
| 2012/0159385 | A1 |   | 6/2012 | Duncan et al. |  |
| 2022/0147196 | A1 | * | 5/2022 | Kim | G06F 1/1652 |

FOREIGN PATENT DOCUMENTS

CN      1300684 C      2/2007

OTHER PUBLICATIONS

"Application as Filed in U.S. Appl. No. 17/741,353", filed May 10, 2022, 34 Pages.
Littlefield, Richardj., "Priority Windows: A Device Independent, Vector Oriented Approach", In Journal of ACM Siggraph Computer Graphics, vol. 18, Issue 3, Jul. 1984, pp. 187-193.
Scheifler, et al., "The X Window System", In Journal of ACM Transactions on Graphics (TOG), vol. 5, Issue 2, Apr. 1, 1986, pp. 79-109.

* cited by examiner

*Primary Examiner* — Mong-Shune Chung

(57) ABSTRACT

Systems and methods for providing a cropped application window of an application window. The systems include a window cropping application that performs a method that allows a user to crop just the portion of an application window the user is interested in (e.g., play controls for a music app, chat window in a gaming app) and place it in an area of the display with enduring visibility or accessibility (e.g., widget dashboard, desktop). The present technology may also be used for web pages (e.g., tutorial articles, reference images), document pages (e.g., reference pages), applications (e.g., calculators), and other scenarios. For example, the present technology described herein improves multi-window scenarios, particularly on small screen devices where screen space is further limited. The present technology makes it easier for users to work across different windows and applications and improve the ease of composing each window.

20 Claims, 13 Drawing Sheets

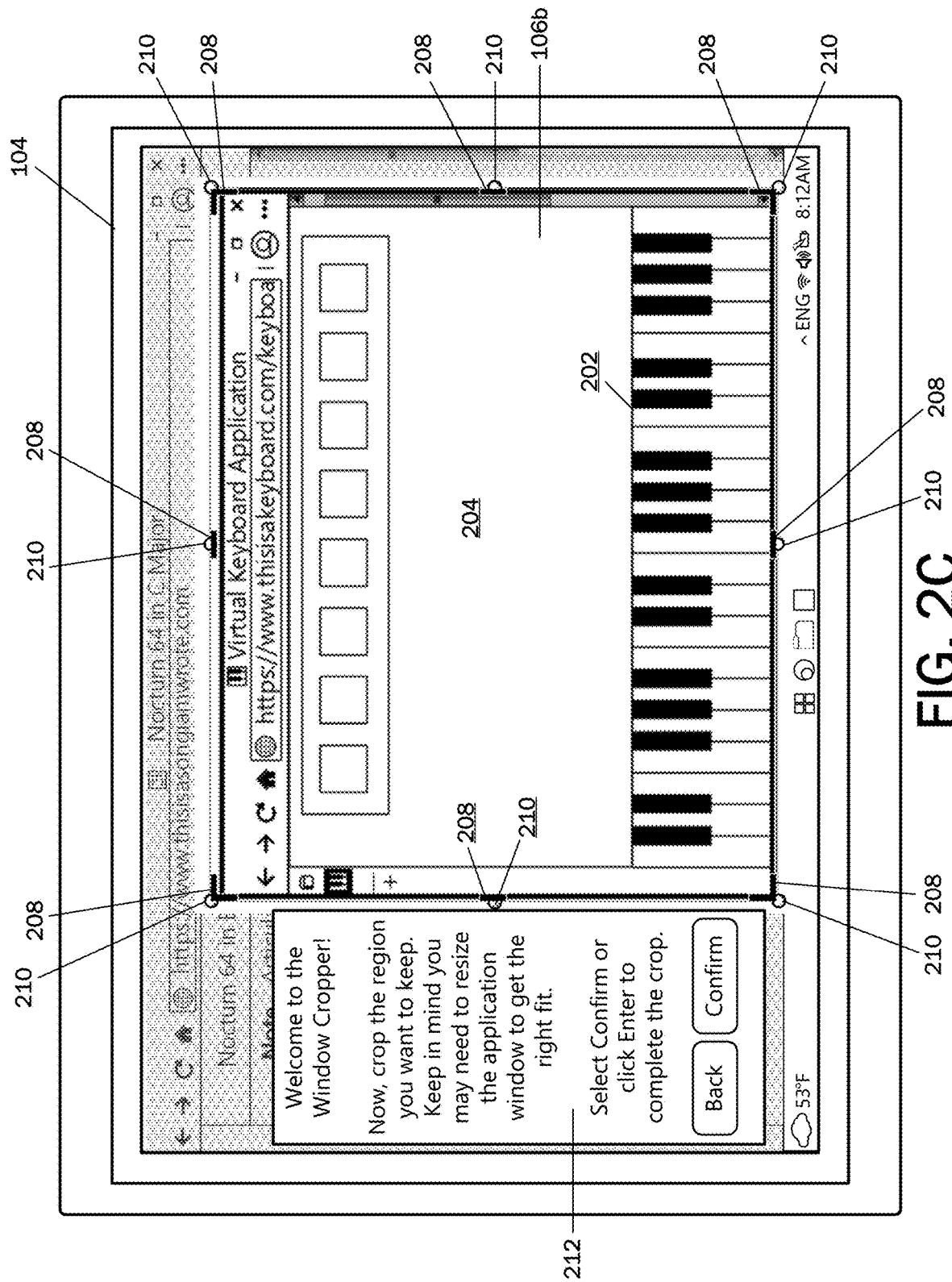

END-USER CREATED CROPPED APPLICATION WINDOW

BACKGROUND

Computing device users oftentimes utilize multiple applications concurrently. Application windows are used to present application functionality and information independent of the other application windows on a computer display screen. To help organize the different applications windows, many operating systems provide the user the capability of resizing and moving the windows across the display screen, such as by a drag-and-drop operation.

It is with respect to these and other considerations that examples have been made. In addition, although relatively specific problems have been discussed, it should be understood that the examples should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

The present technology provides for improved systems and methods for providing a customized cropping or compact overlay of an application window. The technology provides for custom cropping of application windows such that a user may crop an application to only the portion of the application window that is of interest to the user. Such a tool allows for screen real estate to be more efficiently utilized without the need for web or application developers to build compact solutions into their products. In an example, a selection of an application window is received from which a cropped application window is to be generated. Multiple crop and resizing operations may then be presented that allow the user to set a crop region for the application window. Additional options may be displayed regarding the z-order position of the cropped application window and/or a particular user interface in which the cropped application window is to be displayed. Based on the adjusted crop region and the position or location, the cropped application window is generated from the selected application window. The cropped application window can be locked to a host and to a position in the user interface provided by the host. The cropped application window operates similarly to the full application window in that inputs are provided and processed by the application, and outputs are provided to the user via the cropped application window. The cropped application window may also include a title bar that includes additional options for interacting with the cropped application window. Such options may include a recrop option to reconfigure the cropped application window and a peek option to view the whole application window. The configurations of the cropped application windows generated by the present technology may also be saved for later use or recreation of the cropped application windows.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various aspects of the present invention. In the drawings:

FIGS. 2A-2D depict example user interfaces for providing a cropped application window of an application window according to an example.

DETAILED DESCRIPTION

Figure 1:
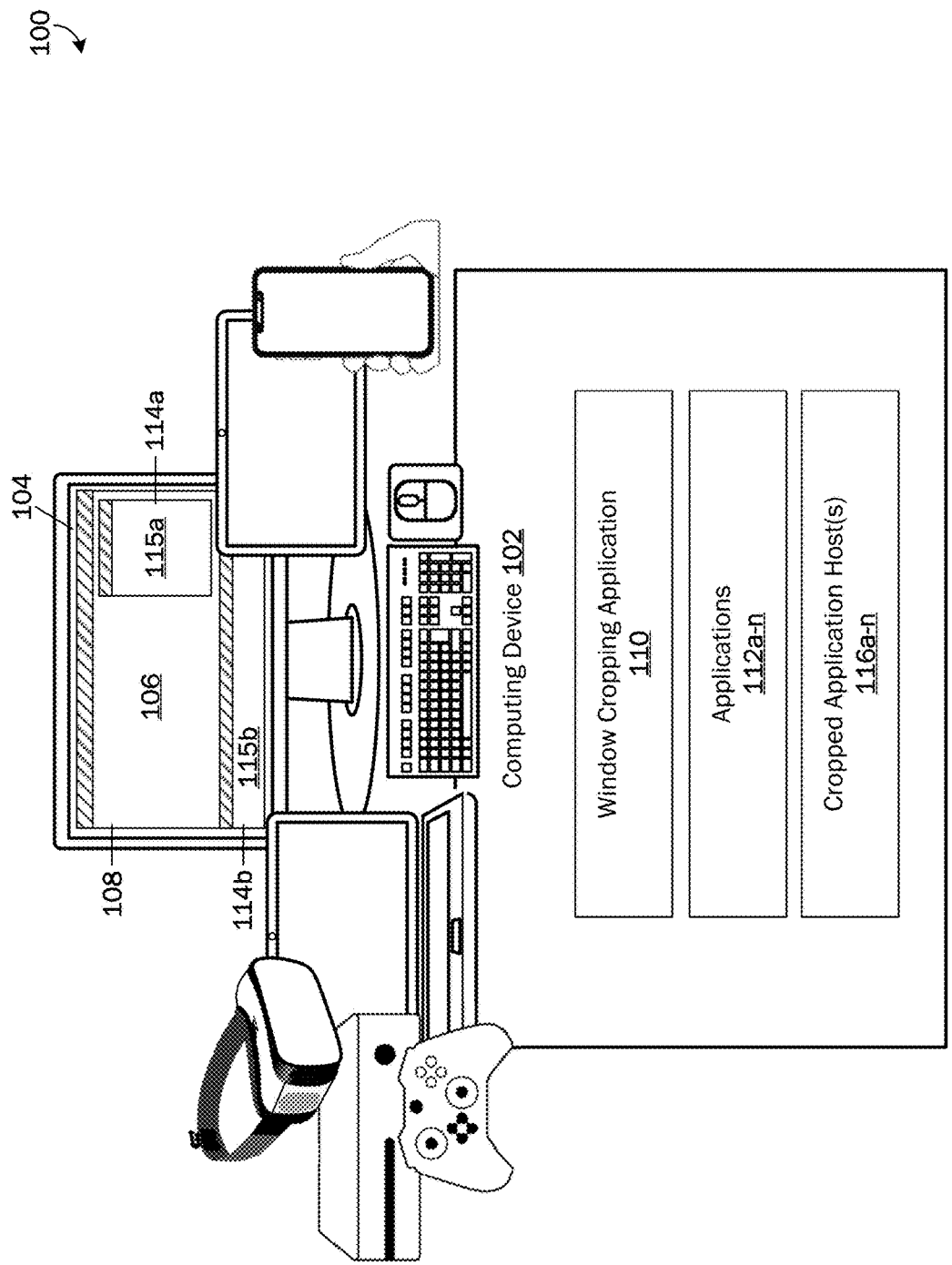
FIG. 1 depicts an example system for providing a cropped application window of an application window.

The following detailed description refers to the accompanying drawings. Wherever possible, the same reference numbers are used in the drawing and the following description to refer to the same or similar elements. While aspects of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims. Examples may take the form of a hardware implementation, or an entirely software implementation, or an implementation combining software and hardware aspects. The following detailed description is, therefore, not to be taken in a limiting sense.

As briefly discussed above, users often have multiple applications in use while operating a computing device, and the data and user interfaces (UIs) for those applications are provided in separate application windows that may be individually manipulated. While separate application windows are useful for allowing users to view and interact with UIs of multiple applications, oftentimes application UIs may have wasted space or present extraneous or less relevant information that may further waste display screen space that could be used for more relevant information in the application UI or for other application windows. Under conventional techniques, users can have difficulty resizing and/or snapping application windows and may waste time trying to access a desired window among multiple windows (e.g., alt+tabbing until the desired window is visible). Moreover, some application windows may have a minimize display size requirement and cannot be resized by the user. When an application window can be resized, the resizing of the application windows often causes the UI or the data therein to become resized or reflowed in undesirable manners. In some instances, the resizing of the window actually causes the unused or wasted space to become more prominent (e.g., taking up a larger percentage of the window).

To alleviate the drawbacks discussed above, among other things, aspects of the present technology allow a user to crop just the portion of an application window the user is interested in (e.g., play controls for a music app, a chat window in a gaming app) and place it in an area of the display with enduring visibility or accessibility (e.g., widget dashboard, desktop). The present technology may also be used for web pages (e.g., tutorial articles, reference images), document pages (e.g., reference pages), applications (e.g., calculators), and other scenarios. Among other benefits, the present technology described herein improves multi-window scenarios, particularly on small screen devices where screen space is further limited. The present technology improves the efficiency of use in available screen real estate by allowing users to work across different windows and applications with only the portions of the window or application which the user intends to use.

FIG. 1 depicts an example system 100 for cropping an application window 108 and causing display of a resulting cropped application window 114a,b (collectively, 114) in an area of a computer display screen 104. According to an aspect, the cropped application window 114 is displayed such that it has enduring visibility and/or accessibility. The system 100 includes a computing device 102 that may take a variety of forms, including, for example, desktop computers, laptops, tablets, smart phones, wearable devices, gaming devices/platforms, virtualized reality devices/platforms (e.g., virtual reality (VR), augmented reality (AR), mixed reality (MR)), etc. The computing device 102 has an operating system that provides a graphical user interface (GUI) that allows users to interact with the computing device 102 via graphical elements, such as application windows 108 (e.g., display areas), buttons, icons, and the like. For example, the graphical elements are displayed on a display screen 104 of the computing device 102 and can be selected and manipulated via user inputs received via a variety of input device types (e.g., keyboard, mouse, stylus, touch, spoken commands, gesture).

The computing device 102 includes a plurality of applications 112a-n (collectively, 112) for performing different tasks, such as communicating, information gathering and/or management, data manipulation, visual construction, resource coordination, calculations, etc. As an example, the applications 112 can include, but are not limited to, a word processing application, a graphics application, a database application, a spreadsheet application, a presentation application, a web browser, enterprise software, an information worker application, a multimedia application, a content access application, and the like. Each application 112 has one or more application UIs 106 by which a user can view application data and interact with the application 112. For example, an application UI 106 is presented in a window, herein referred to as an application window 108, where, when displayed, occupies at least a portion of the display screen 104.

According to an example implementation, the operating environment is a multi-application environment by which a user may view and interact with multiple applications 112 through multiple application UIs 106. Each application UI 106 is displayed in an application window 108 of a plurality of application windows. In some examples, at least two of the plurality of application windows 108 can overlap. In some examples, multiple application windows 108 can be displayed in a tiled layout, for instance, where the display screen 104 is split into halves, quarters, and/or other portions and the application windows 108 are displayed side-by-side and/or on top and bottom of one another. In some examples, an application window 108 can be moved and resized. While presenting multiple application UIs 106 associated with multiple respective applications 112 is useful in a multi-application environment, as mentioned above, using conventional techniques, a user can have difficulty resizing and/or snapping application windows 108 and may waste time trying to access a desired application window 108 among multiple application windows 108. Additionally, an application UI 106 may include one or more toolbar UIs that include various buttons for performing actions relevant to a current view. Oftentimes, particularly when the application UI 106 is sized to smaller than full-screen, the toolbar UI(s) occupy space that may be more useful to the user if it were to display other application content. While some applications 112 may allow a user to minimize or close a toolbar UI, this is an additional step required to be performed by the user. Moreover, providing such functionality requires that the developer of the application or webpage build in such features prior to delivering or releasing the product.

Accordingly, the example system 100 of the present disclosure includes a window cropping application 110 that provides one or more cropped application windows 114 for displaying one or more cropped application UIs 115a-b (collectively, 115). As will be described in further detail below, the window cropping application 110 provides functionality for enabling a user to crop a desired portion of an application window 108 and to place the cropped application window 114 in an area of the display screen 104 where the cropped application window 114 has enduring visibility and/or accessibility relative to other application windows 108. Among other benefits, the window cropping application 110 enables an efficient use of available display area of the display screen 104 in a multi-application environment. As can be appreciated, on a small screen device, such as a mobile phone or tablet device where the available display area is constrained, providing a cropped application window 114 that can be positioned to stay on top of other application windows 108 or otherwise be easily accessible allows for maximizing the available display area and a number of applications 112 that a user may be able to use concurrently. For example, the window cropping application 110 may generate a plurality of cropped application windows 114 for a plurality of applications 112 and cause the plurality of cropped application windows 114 to be displayed in one or more UIs (e.g., a game bar, a widgets dashboard, a desktop) provided by one or more cropped application window hosts 116a-n (collectively, 116). In some examples, the window cropping application 110 includes one or more interfaces through which the window cropping application 110 interacts with the one or more cropped application window hosts 116, such as for displaying a cropped application window 114 in a window host UI. In some example implementations, the window cropping application 110 further provides functionality for moving, resizing, zooming into and out of the cropped application window 114, and other features. These and other aspects are described in further detail below.

Figure 2A:
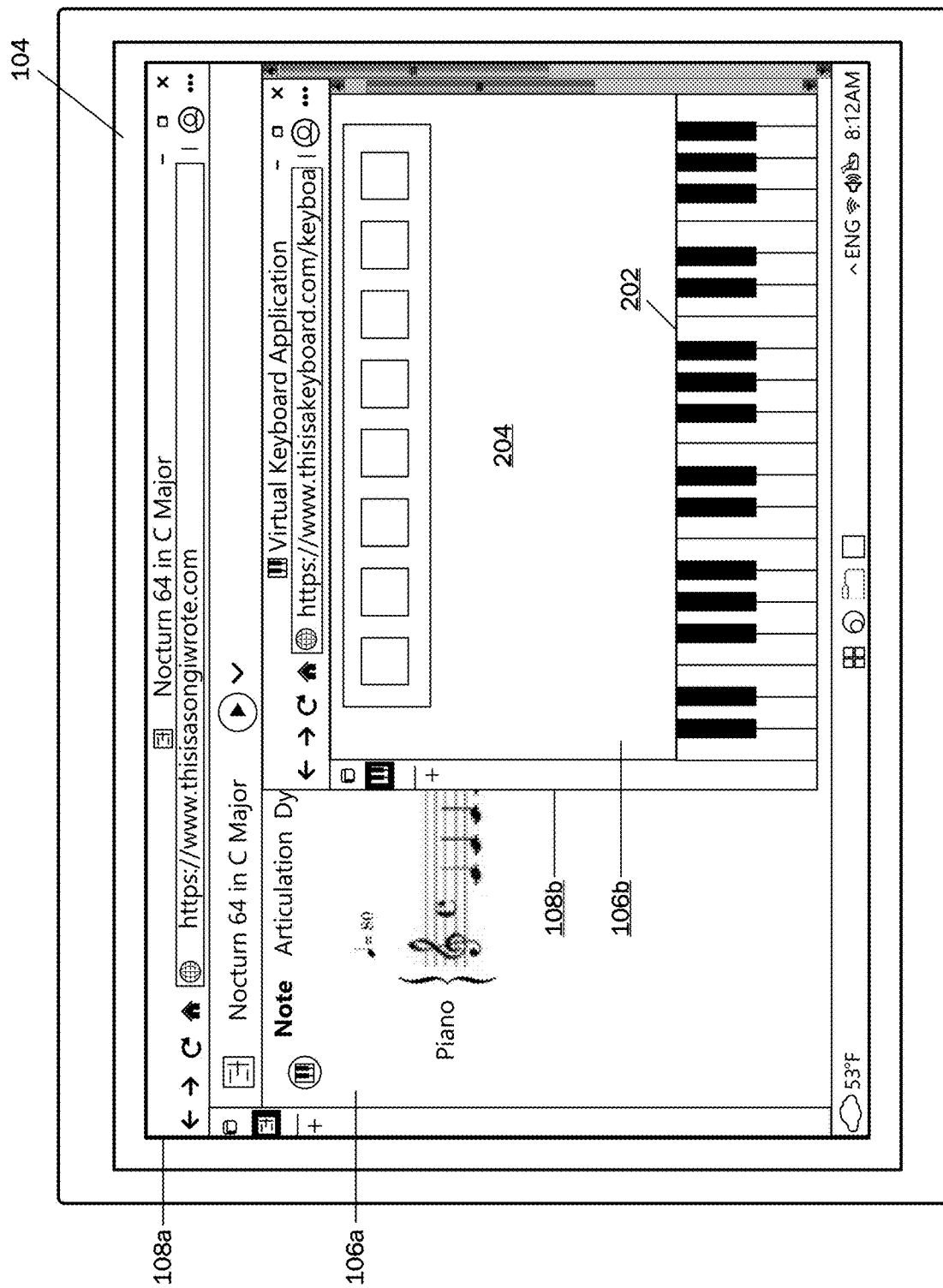

FIGS. 2A-2D are illustrations depicting example UIs that may be displayed as part of cropping a desired portion of an application window 108. With reference now to FIG. 2, a first application UI 106a associated with a first example application 112a is displayed in a first application window 108a on a display screen 104. The first example application 112a is depicted in FIG. 2A as a music composing application, for example, that may be accessed via a web browser installed on a respective computing device 102 associated with the display screen 104. For example, the music composing application may be a web app that is accessed via the web browser. As further depicted in FIG. 2A, a second application UI 106b associated with a second example application 112b is displayed in a second application window 108b on the display screen 104. The second example application 112b is shown as a virtual keyboard application that is also accessed via a web browser (e.g., another web app) installed on the computing device 102. For instance, the user may use the first and second applications 112a, 112b concurrently. As should be appreciated, the example applications 112a,b depicted in FIGS. 2A-2D are for illustration purposes only. Other types of applications 112, including local applications, are possible and are within the scope of the present disclosure. For instance, the techniques herein may be used for web pages, document pages, applications, and other scenarios.

As shown in FIG. 2A, the second application window 108b is covering a portion of the first application window 108a, which may prevent the user from having access to application content in the first application window 108a that may be useful to the user. Additionally, if the user selects the first application window 108a, the second application window 108b may become hidden behind the first application window 108a. In some examples, an application UI 106 may include a portion that may be relevant to the user at a given time (e.g., a relevant region 202) and a portion that may be less relevant to the user at a given time (e.g., an extraneous region 204). For instance, and as depicted, the second application UI 106b includes a relevant region 202 that includes a virtual keyboard and an extraneous region 204 that includes a toolbar and empty space, as an example. The user may wish to access the relevant region 202 of the second application UI 106b while also having access to the first application UI 106a. Merely resizing or rearranging the application windows 108a, 108b, however, may be inadequate. For example, the resizing application window 108b may cause the virtual keyboard to reflow or shrink to a size that is unusable. Accordingly, to avoid the problems associated with resizing the windows, the user may select to launch, activate, or otherwise access the window cropping application 110. For instance, launching the window cropping application 110 may include launching the application through selection of an icon, a keyboard shortcut, a voice command, or other types of input.

Figure 2B:
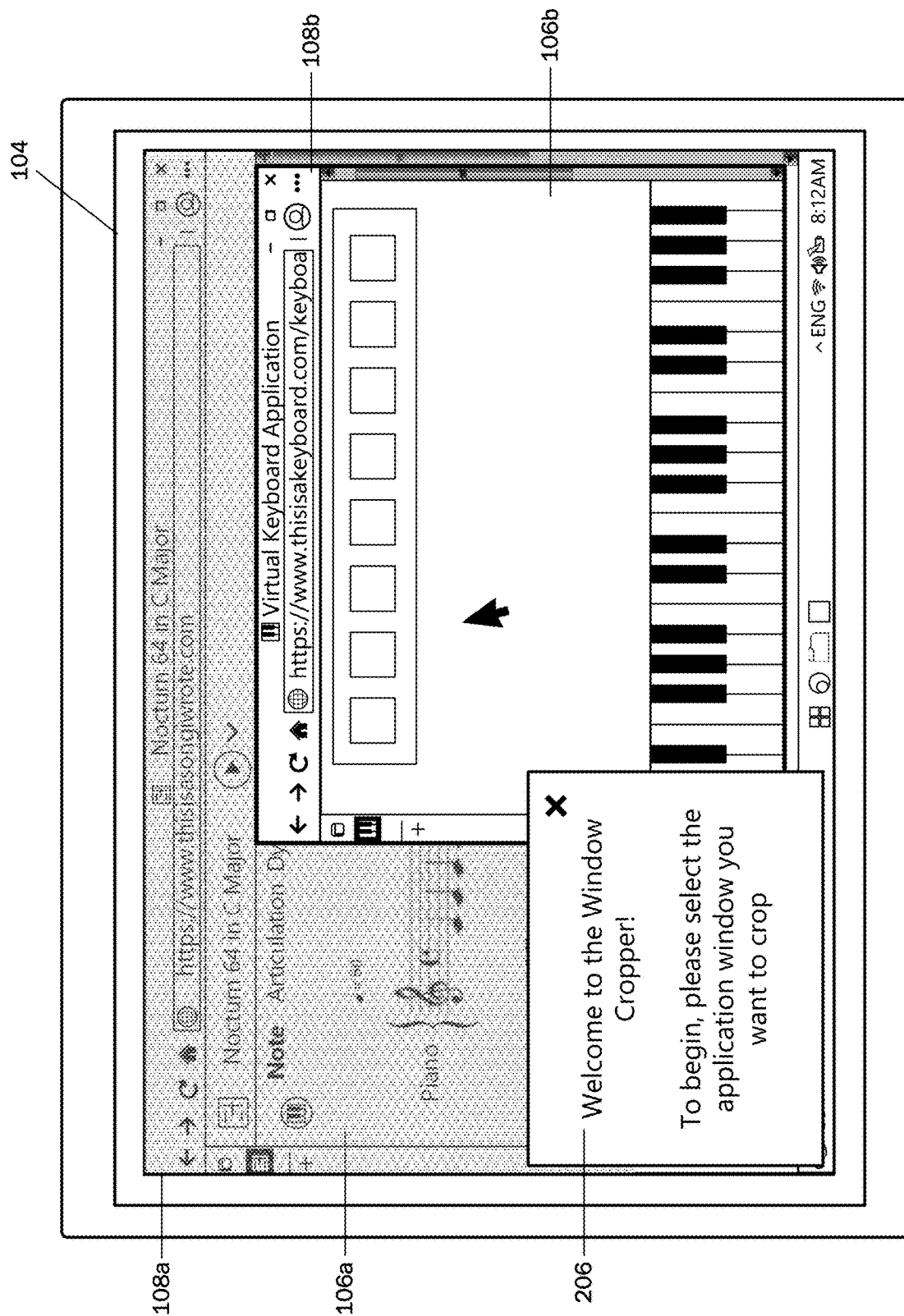

With reference now to FIG. 2B, in response to launching, activating, or otherwise accessing the window cropping application 110, a first window crop tool UI 206 of the window cropping application 110 may be displayed. For example, the first window crop tool UI 206 includes instructions (e.g., text and/or graphics) for selecting the application window 108 the user wants to crop. The window cropping application 110 may also automatically activate functionality to allow for selection of an application window 108. Thus, and in the example depicted in FIG. 2B, the user may select the second application window 108b. In some examples, hovering over an application window 108 may cause the hovered-over application window 108 to become emphasized. In some examples, as shown in FIG. 2C, selection of an application window 108 may cause the window cropping application 110 to display a plurality of crop handles 208 around the selected window. In further examples, a plurality of resize handles 210 are also displayed around the selected window.

For example, and with reference to FIG. 2C, in response to a selection of the second application window 108b, the plurality of crop handles 208 and resize handles 210 are shown displayed around the second application window 108b. Accordingly, the user may select and drag the crop handles 208 to crop out the region the user does not want to keep (e.g., the extraneous region 204) and/or select and drag the resize handles 210 to resize the crop region the user wants to keep (e.g., the relevant region 202). For instance, the user may want to maximize the width of the display screen 104. So, the user may first use the resize handles 210 to expand the second application UI 106b including the keyboard to fill the horizonal area of the display screen 104 and then use the crop handles 208 to crop out the extraneous region 204 by setting a crop region that includes only the relevant region 202 (e.g., the keyboard).

The user may then confirm the crop selection, such as via selecting a confirm option or an enter command. In some examples and as depicted, a second window crop tool UI 212 may be displayed after or in response to an application window being selected for cropping. For example, the second window crop tool UI 212 may include instructions (e.g., text and/or graphics) for cropping, resizing, and confirming the crop selection. In other example implementations, other crop options (e.g., freeform, shape) and resize options (e.g., zoom level selector) may be provided. The second window crop tool UI 212 may also include a "Back" selectable UI element (e.g., button) and a "Confirm" selectable UI element. Upon receiving a selection of the Back button, the window cropping application 110 reverts to the prior stage where an application may be selected. Upon receiving a selection of the Confirm button, the window cropping application 110 confirms the selection of the set crop region and moves to the next stage discussed below.

Figure 2D:
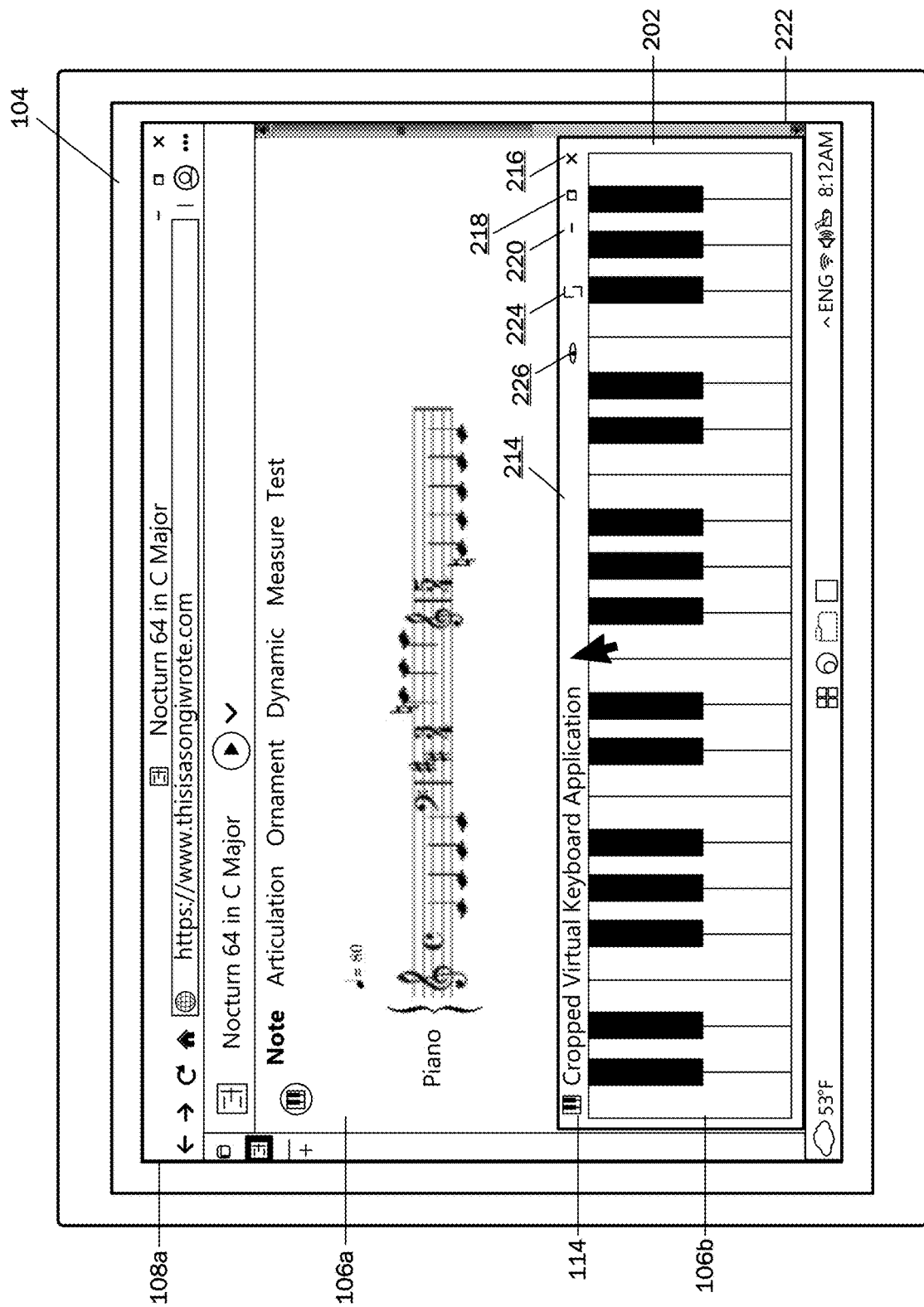

As depicted in FIG. 2D, a selection to confirm the crop selection may cause the window cropping application 110 to crop the selected application window 108 to create a cropped application window 114. For instance, the cropped application window 114 is created based on positions of the crop handles 208 and on positions of the resize handles 210 relative to their original displayed positions. The cropped application window 114 allows for the selected portion (e.g., relevant region 202) of the second application UI 106b to be displayed while efficiently saving display screen space for other applications 112 (e.g., the first application window 108a).

In some examples, the window cropping application 110 is configured to set a property associated with the cropped application window 114 that causes the cropped application window 114 to be displayed as a frontmost application window 108. Accordingly, upon selection of another application 112 or application window 108, the cropped application window 114 will remain displayed in front, and thus on top, where the cropped application window 114 is not hidden behind the other application 112 or application window 108.

In some examples, the window cropping application 110 is configured to set a property associated with the cropped application window 114 that causes the cropped application window 114 to be displayed in and, in some examples, docked to a bottommost position in a desktop UI 222 displayed on the display screen 104. For instance, the example cropped application window 114 is configured to remain behind all open application windows almost as if the example cropped application window 114 were part of the desktop.

As an example, the cropped application window 114 can be displayed as a widget. A widget may serve as a compact version of the corresponding application UI 106 and may include a selection of controls to easily perform a set of actions without having to access a full-sized version of the application UI 106. While some applications 112 may be pre-configured to provide a widget, this typically requires a developer to build the widget specific to the application 112, which, in some cases, can take significant development time. Thus, developers may be reluctant to build widgets, and many applications 112 do not provide a cropped application window version of their application UI 106. Even when a widget is available, it may not include a relevant region 202 of the application UI 106 for the user. Accordingly, the window cropping application 110 enables the user to select the portion of the application UI 106 that is relevant to them and to create a personalized cropped application window experience of the application UI 106 that is useful to the specific user. According to an aspect, all input events that would be associated with the application 112 in its corresponding application window 108 are also processed and transmitted via the corresponding cropped application window 114 so that the user is enabled to interact with the application 112. In the example of the virtual keyboard, when a selection of a key is received via the example cropped application window 114, that selection input is processed by the corresponding web browser application and sent to the website providing the virtual keyboard functionality. A corresponding sound or response (e.g., the note/sound that is played in response to the virtual key selection) is also provided back to the user. As such, the functionality of the application 112 from which the example cropped application window 114 was generated is retained.

In some examples, settings and other information associated with the cropped application window 114 may be stored so that a same cropped region of an associated application window 108 may be recalled and used to recreate the cropped application window 114.

As further shown in FIG. 2D, in some examples, the cropped application window 114 includes a title bar 214. For example, once the confirmation is received, the cropped area may be surrounded by a border and a title bar 214 may be generated for the resultant cropped application window 114. In some examples, the title bar 214 is selectively displayed. For instance, hovering over the cropped application window 114 or a designated area of the cropped application window 114 (e.g., the area where the title bar 214 would be displayed or a top portion of the cropped application window 114 within a threshold distance from the top edge) may cause the hovered-over title bar 214 to be displayed. The title bar 214 may include a title of the application 112 corresponding to the cropped application window 114, a title of a current document or file, or other text identifying the content of the cropped application window 114. The title displayed in the title bar 214 may also be modified to indicate that the content being displayed is in a cropped application window 114 rather than a traditional application window 108. For instance, in the example depicted, the original title of the webpage/application was "Virtual Keyboard Application," and the title of the cropped application window is "Cropped Virtual Keyboard Application." In some examples, the user can select the title displayed in the title bar 214 to rename the cropped application window 114.

The title bar 214 may further include a close command 216, a maximize/resize command 218, and a minimize command 220. For example, selection of the close command 216 may cause the window cropping application 110 to close the cropped application window 114. In some examples, closing the cropped application window 114 may cause a redisplay of the second application UI 106b in its uncropped and unresized format in the second application window 108b. In other examples, a restore command may be included in the title bar to cause a redisplay of the applicant window 108b. Selection of the maximize/resize command 218 may cause the window cropping application 110 to maximize the cropped application window 114, and selection of the minimize command 220 may cause the window cropping application to minimize the cropped application window 114. Because the cropped application window 114 may have non-traditional dimensions due to the size of the cropped region, maximizing the cropped application window 114, may cause the cropped application window to expand until its largest dimension reaches the corresponding dimension of the display area. For instance, the cropped application window 114 maximizes its size to a boundary of the display area while maintaining the aspect ratio of the cropped application window 114.

The title bar 214 may also include a peek option 226 and a recrop option 224. Selection of the peek option 226 causes the application window 108 from which the cropped application window 114 was generated to be displayed. For instance, a selection of the peek option 226 may be received (e.g., a touch, gesture, voice command, or mouse click), and a preview of the application window 108 may be displayed for the duration of the selection. In other examples, the peek option 226 may serve as a toggle, such that a first selection of the peek option causes the application window 108 to be displayed, and a second selection causes the peek option to be removed. For instance, the user may wish to access or see content that is included in the application window 108 but that was cropped from the cropped application window 114. In other examples, a popup or other message may appear in the application window 108 in a position that is not shown by the cropped application window 114.

The recrop option 224 allows for the cropped application window to be recropped. For instance, selection of the recrop option 224 causes the window cropping application 110 to display crop options for adjusting the crop region. For instance, the crop options shown in FIG. 2C may be redisplayed. Once the readjusted crop region is set via user input, the cropped application window may be regenerated with the adjusted crop region. In some examples, the options of the title bar 214 may instead be shown in a context menu that may be displayed in response to a right click, long press, or some similar input.

Generating the cropped application window 114 may be performed in a variety of manners. For example, generating the cropped application window may be performed by causing the remainder of the application window 108 (e.g., the unselected portion of the application window 108 or the area outside the cropped region) to no longer be displayed or rendered. This may be accomplished by preventing the rendering/display, displaying the area outside the cropped region in a transparent or translucent state, or another technique. Inputs that would have otherwise been to the unrendered or non-displayed portion of the application window 108 are also not processed as being related or directed to the application window 108. Accordingly, the application 112 of the application window 108 continues to operate such that it can receive and process inputs and provide outputs via the cropped application window 114. In addition, as the example cropped application window 114 is moved around (e.g., by the user), the corresponding application window 108 is also moved.

In other examples, the example cropped application window 114 may be generated as a new window and the prior application window is minimized. In such examples, the inputs received through the cropped application window 114, and/or the position of the cropped application window 114, may need to be communicated to the original application window 108. For instance, an input received at the cropped application window 114 has an x-y position within the cropped application window according to the size and/or zoom value of the content in the cropped application window. That x-y position of the input (and an input type) is then passed to the original application window 108. To the extent the zoom values for the application window 108 and the cropped application window 114 are different, the input received at the cropped application window 108 may be translated before being provided to the original application window 108. Passing the input from the cropped application window 114 to the original application window 104 may be performed by the window cropping application 110 and/or the operating system. In some examples, the window cropping application 110 may utilize an application programming interface (API) of operating system to accomplish receiving the input and transmitting the input to the original application window 108. Outputs from the original application window (such as outputs provided in response to inputs) may similarly be transferred from the original application window 108 to the cropped application window 114.

In addition to processing inputs and outputs, the cropped application window 114 also may refresh or be refreshed just as the original application window 108 may refresh or be refreshed. For instance, a refresh command (e.g., F5, Ctrl+R) causes the cropped application window 114 to refresh while still maintaining the cropped area of the application window.

In some examples, the cropped application window 114 can be located/relocated to a variety of locations on the display screen 104. For instance, the user may select and hold a cursor (or touch input) on the title bar 214 to drag and relocate the cropped application window 114 to a desired location. Or, the user may configure the cropped application window 114 to be located in a desired location via a selection of one or more menu selections or other settings. The locations may include various UIs, such as the desktop UI 222 illustrated in FIG. 2D, a widgets dashboard (shown in FIG. 3), a game bar (shown in FIG. 4), or other UIs.

In some examples, when the cropped application window 114 is being generated, an option is presented regarding where or how the cropped application window 114 is to be displayed. For instance, the relative z-order or depth position (e.g., always on top or always on bottom) may be provided as a selectable option. Additionally or alternatively, an option for selecting with which service the cropped application window 114 is to be registered may be presented. For instance, an option to register the cropped application window 114 with a widgets dashboard, a game bar, or some other predefined display set may be presented.

Figure 3:
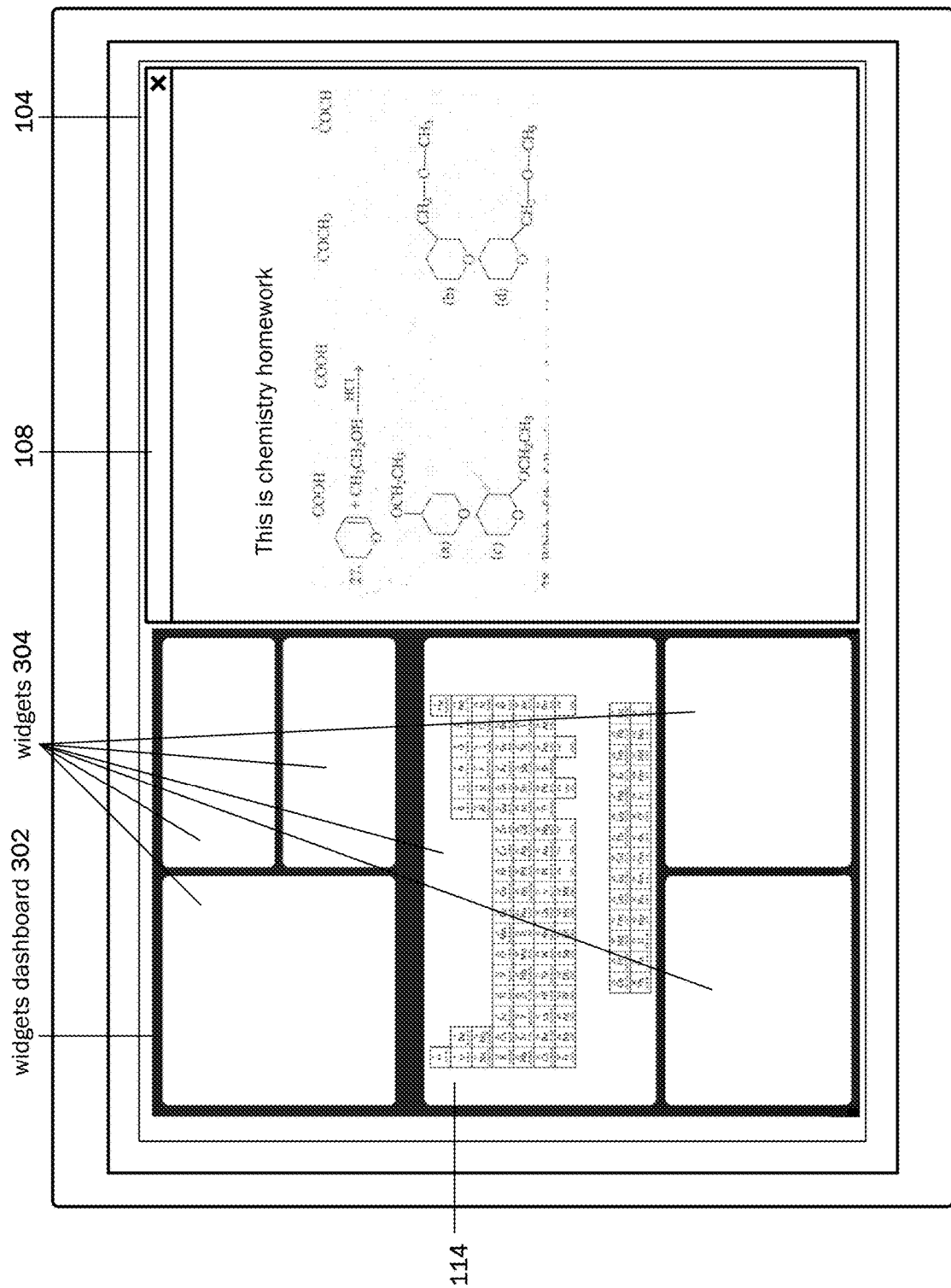
FIG. 3 depicts an application window included in an example widgets dashboard user interface according to an example.

With reference now to FIG. 3, an example cropped application window 114 is shown included in an example widgets dashboard 302. The widgets dashboard 302, in one example, is a flyout UI that overlays screen content when accessed. For example, the widgets dashboard 302 is temporarily displayed or can take up a permanent region on the desktop UI 222 (e.g., by default or in response to a user pinning or otherwise making a selection on the flyout widgets dashboard 302). In another example, the widgets dashboard 302 is a dashboard that uses any other suitable display technique. In some examples, the widgets dashboard 302 includes a plurality of small windows, which are herein referred to as widgets 304, that display various application 112 information. For example, the user may selectively add, remove, arrange, resize, and customize the widgets 304 to reflect the user's interests and the way they work. In some examples, the widgets dashboard 302 is selectively opened from a taskbar of the desktop UI 222. For example, the user may want to utilize another application 112, such as a productivity application, to complete a task. The user may additionally want to access the cropped application window 114 when needed. Accordingly, the user may select to add a widget 304 to the widgets dashboard 302 that includes the cropped application window 114. Thus, the user may be enabled to easily access the cropped application window 114 from the widgets dashboard 302 when needed.

Figure 4:
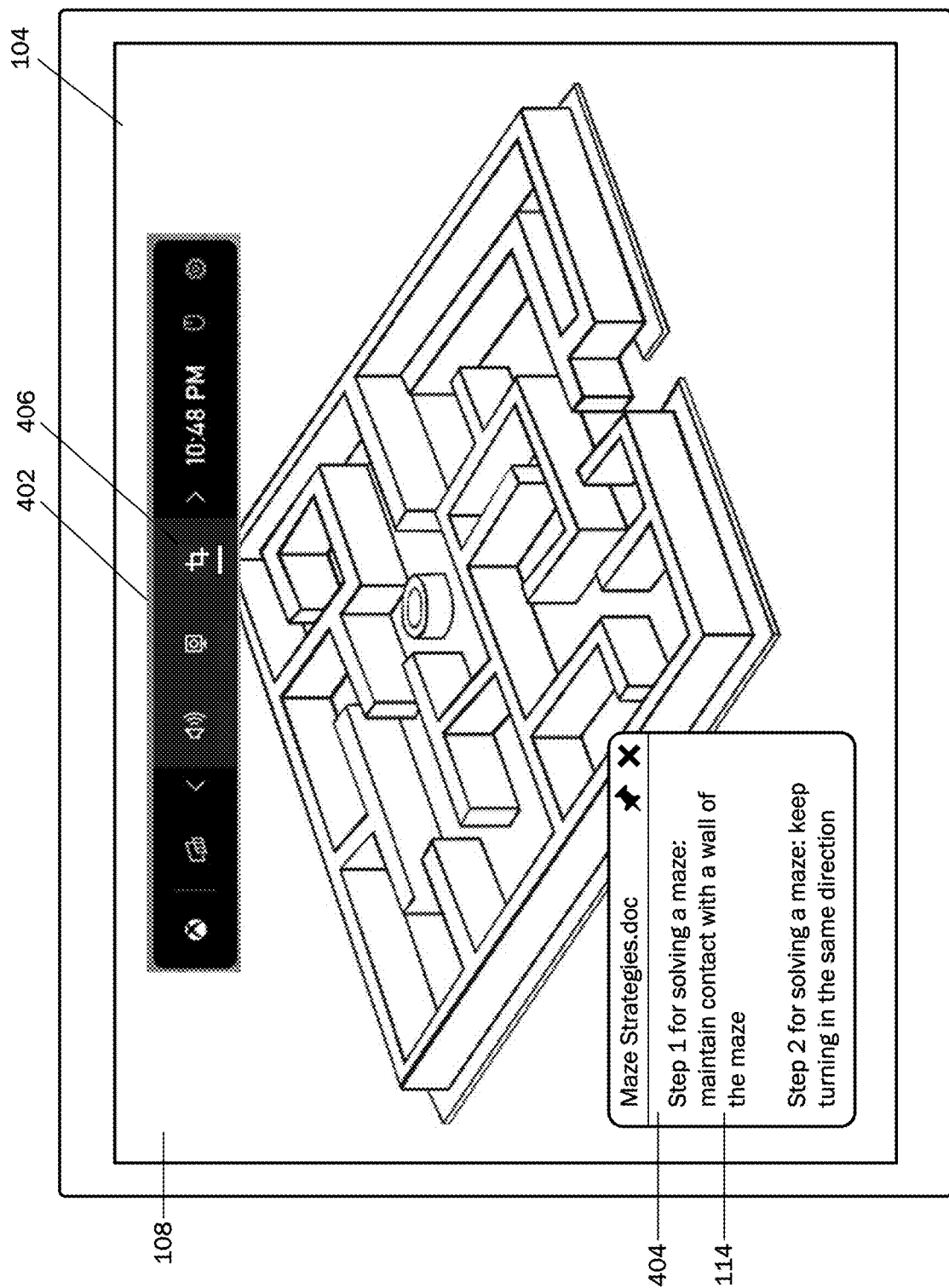
FIG. 4 depicts an application window included in an example game bar user interface according to an example.

With reference now to FIG. 4, a cropped application window 114 is included in an example game bar UI 402 that is selectively displayed on the desktop UI 222. A game bar UI 402, in one example, is a customizable gaming overlay that includes and gives users access to a plurality of game bar widgets 404. For instance, the game bar widgets 404 may allow users to seamlessly jump between a game and another application activity. For example, a game bar widget 404 is displayed in response to a user making a selection of a corresponding widget selector 406 included in the game bar UI 402. One example game bar widget 404 may be created for a cropped application window 114, where a selection to display the game bar widget 404 causes a display of the cropped application window 114 on the desktop. The user may be enabled to select and drag the game bar widget 404 to move it another position on the display screen 104. In some examples, the game bar widget 404 associated with the cropped application window 114 can be selectively pinned to the desktop UI 222, where the cropped application window 114 may be displayed on the display screen 104 over any game or other application 112. As should be appreciated, other types of UIs hosted by one or more cropped application window hosts 116 in which a cropped application window 114 can be located are possible and are within the scope of the present disclosure.

Figure 5:
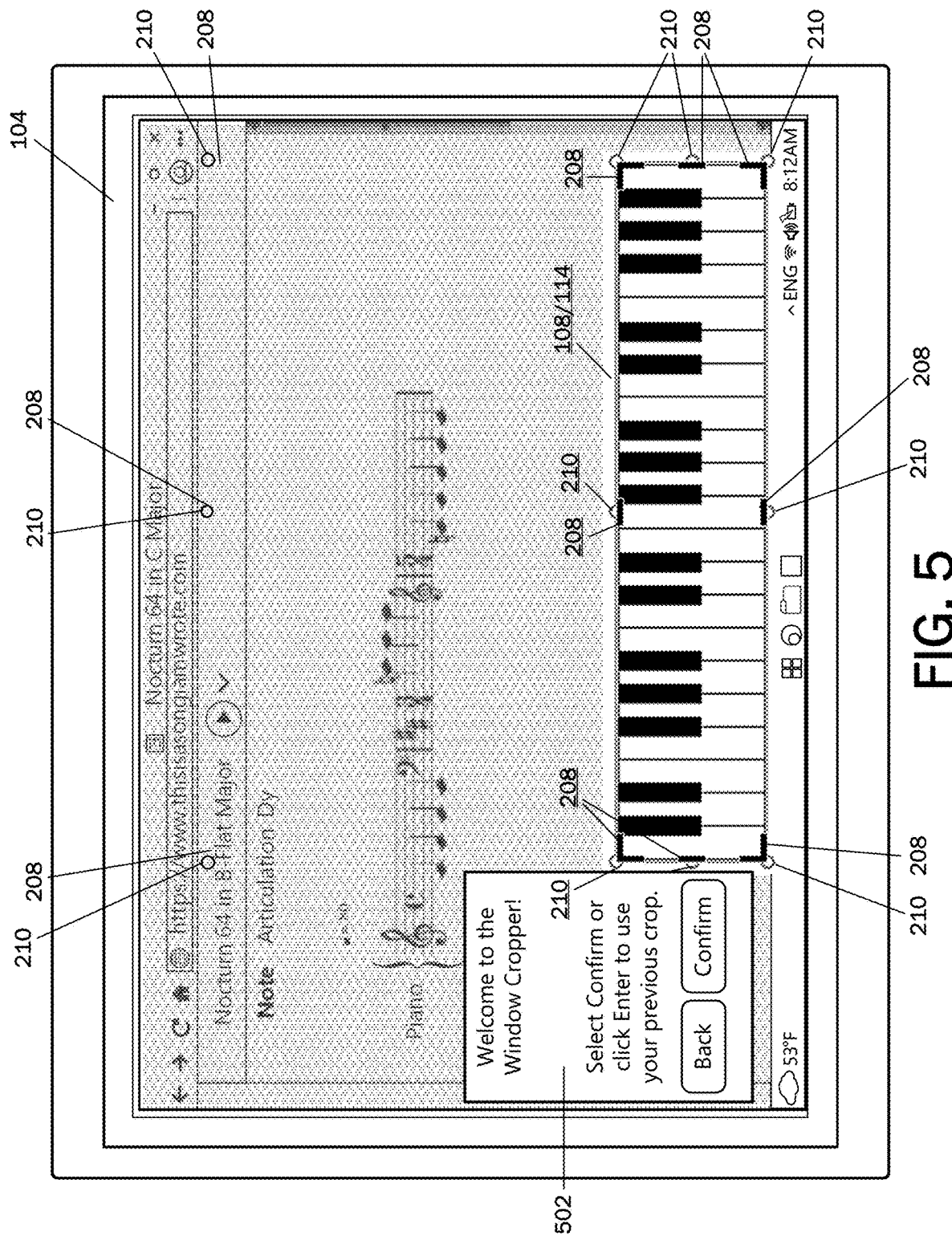
FIG. 5 depicts an example user interface for providing a cropped application window based on stored information of a previously cropped application window according to an example.

FIG. 5 is an illustration depicting an example UI that may be displayed as part of automatically providing a saved cropped application window 114. For example, when a copped application window 114 is created, the window cropping application 110 may store information associated with the cropped application window 114. The cropped window information may include, for example, information about the associated application 112, an identifier associated with the application window 108 that was cropped (e.g., window ID), coordinates of the cropped region, an amount of zoom and/or scroll position within the application window 108, coordinates of the location of the cropped application window 114, and/or other information that may enable the window cropping application 110 to crop, resize, and/or move a selected application window 108 to match a previous cropped application window 114 at a later time. For example, the later time may include a time after the cropped application window 114 and the crop tool application 110 have been closed. In an example, in response to a user making a selection to crop an application window 108, a determination is made by the window cropping application 110 whether a cropping of the application window 108 has been performed previously based on stored information associated with a previously cropped application window 114.

In some examples, and as shown in FIG. 5, in response to determining that information is stored for a previously cropped application window 114 that is related to the selected application window 108 (e.g., the same application 112, the same application window ID), the selected application window 108 may be displayed in a cropped, resized, and/or moved state based on the stored information. In some examples and as depicted, a third window crop tool UI 502 may be displayed after or in response to a selection of an application window 108 for cropping that matches information stored for a previously cropped application window 114. For example, the third window crop tool UI 502 may include a message and/or option that allows the user to accept the crop selection corresponding to the cropped, resized, and/or moved state in which the selected application window 108 is displayed. For instance, the user may confirm the crop selection, such as via selecting a confirm option or an enter command. In an example, crop handles 208 and resize handles 210 are displayed around the selected application window 108. Accordingly, the user may select and drag the crop handles 208 and/or resize handles 210 to adjust the crop selection, such as to adjust the cropped region, size, or location of the cropped application window 114. In some examples, the window cropping application 110 includes a sharing feature that allows stored information for a previously cropped application window 114 to be shared (e.g., with another user, to another computing device 102). For instance, the window cropping application 110 operating on another computing device 102 can receive and store the shared information for a previously cropped application window 114. When an application window 108 on the other computing device 102 is selected to be cropped that matches the shared information, the window cropping application 110 can automatically crop the selected application window 108 based on the crop selections corresponding to shared information.

Figure 6A:
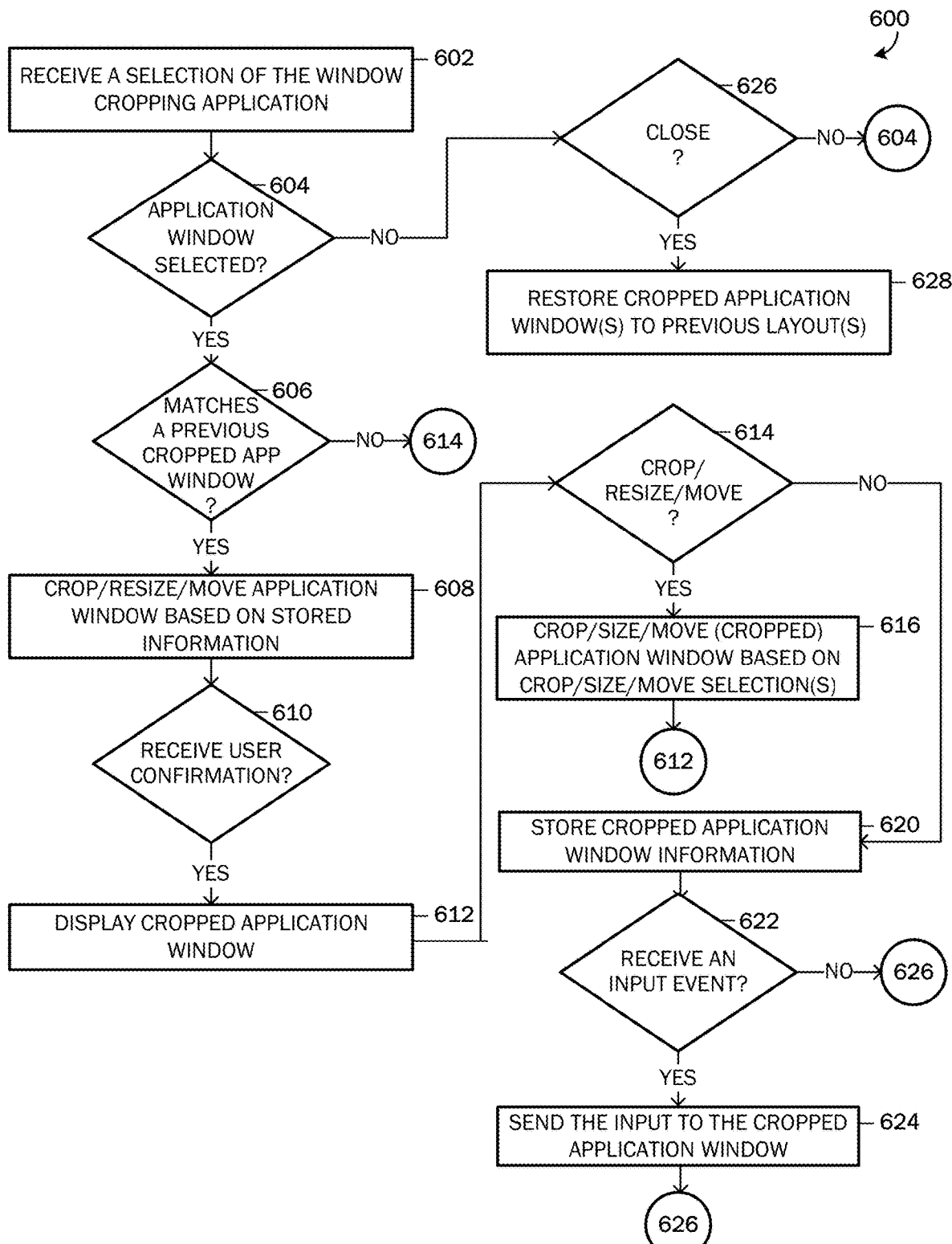
FIG. 6A depicts an example method for providing a cropped application window of an application window according to an example.

FIG. 6A depicts an example method 600 for providing a cropped application window 114 of an application window 108 according to an example. At operation 602, a selection of the window crop tool or window cropping application 110 is received. The selection may be a selection to open the window cropping application 110 or to access the window cropping application 110, if it is already running.

At decision operation 604, a determination is made whether an application window 108 has been selected. When an application window 108 is selected, the method flows to decision operation 606, where a determination is made whether the selected application window 108 matches stored information associated with a previously-saved cropped application window. When the selected application window 108 matches stored information associated with a previously-cropped application window, at operation 608, the selected application window 108 is automatically cropped, resized, and/or moved to another location on the desktop UI 222 based on stored cropping, resizing, and/or location information of the previously cropped application window. At decision operation 610, a determination is made whether user confirmation is received for the crop selections for the selected application window 108. When confirmation is received, such as via a selection of a Confirm option, enter, or another command of confirmation, the resulting cropped application window 114 is displayed at operation 612, where the cropped application window 114 is displayed with enduring visibility or accessibility in the desktop UI 222. For example, the cropped application window 114 may be configured to stay on top of the display.

When user confirmation is not received at decision operation 610, at decision operation 614, a determination is made whether a selection is received to crop, resize, and/or move the selected application window 108. Or, when the cropped application window 114 is displayed based on stored cropping, resizing, and/or location information at operation 612, a determination is made whether a selection is received to re-crop, resize, and/or relocate the selected cropped application window 114. For example, when the user selects to crop, resize, or move the application window 108 or cropped application window 114 (e.g., via a selection and movement of a crop handle 208 and or a resize handle 210, via a selection and drag of the application window 108 or cropped application window 114), at operation 616, the application window 108 or cropped application window 114 may be cropped, resized, and/or moved based on the user selections. The method 600 may return to operation 612, where the cropped application window 114 is displayed based on received cropping, resizing, and/or movement selections received from the user.

When a selection is not received to crop, resize, or move the cropped application window at decision operation 614, information associated with the cropped application window 114 is stored at operation 620. The cropped window information may include, for example, information about the associated application 112, an identifier associated with the application window 108 that was cropped, coordinates of the cropped region, an amount of zoom, coordinates of the location of the cropped application window 114, and/or other information that enables the window cropping application 110 to crop, resize, and/or move a selected application window 108 to match a previous cropped application window 114.

At decision operation 622, a determination is made as to whether an input event is received in association with the cropped application window 114. When an input event is received, the input is sent to application UI 106 of the cropped application window 114 at operation 624. For example, a received scroll event may be sent to the cropped application window 114, and the user may be able to scroll through and/or interact with application content included in the application UI 106. In other example, an option is available that enables the user to lock or unlock the application content included in the application UI 106 from all or particular interactions (e.g., scrolling, moving). For instance, the user may want to interact with application content included in the application UI 106 without fear that accidental scrolling on the cropped application window 114 will move the relevant region 202 of the cropped application window 114 from view.

At decision operation 626, a determination is made as to whether to close the cropped application window 114 and/or the window cropping application 110. For example, when the user selects to close the cropped application window 114 and/or the window cropping application 110, the corresponding application UI 106 may be restored to its original size and layout and displayed in the application window 108 at operation 628.

When the cropped application window 114 and/or the window cropping application 110 are not closed at decision operation 626, the method 600 may return to operation 604. For example, the method 600 may continue, where various input events may be received, the cropped application window 114 may be re-cropped, resized, and/or moved to another location, a new cropped application window 114 may be created, etc., until a selection to close the cropped application window(s) 114 and/or the window cropping application 110 is received at decision operation 626.

Figure 6B:
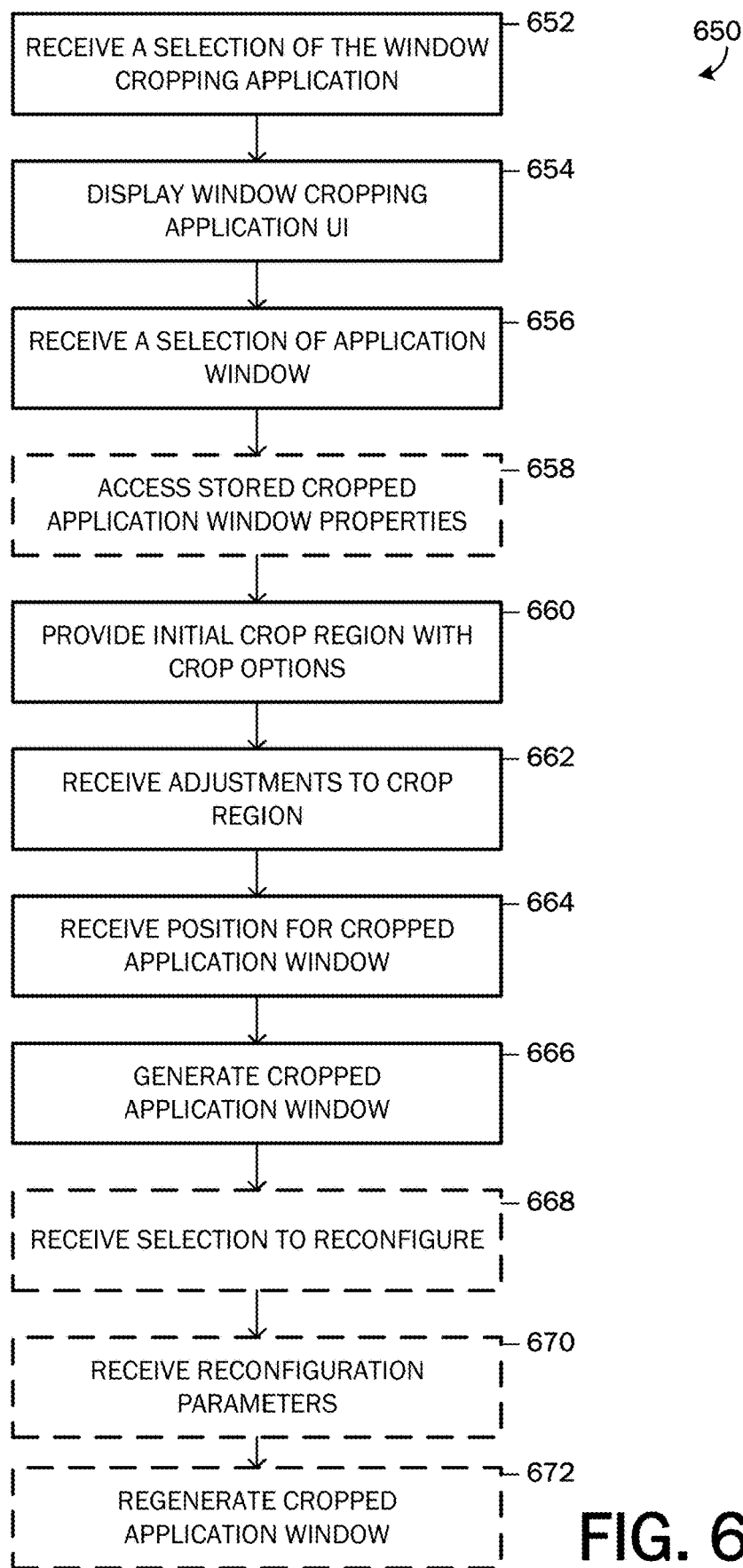
FIG. 6B depicts another example method for providing a cropped application window of an application window according to an example.

FIG. 6B depicts another example method 650 for generating a cropped application window. At operation 652, a selection to launch the window cropping application 110 is received. At operation 654, the window cropping application 110 may then launch and provide a user interface that guides the user through the cropping process to generate the resultant cropped application window 114. A selection of an application window 108 from a plurality of open application windows may then be received at operation 656. The selected application window 108 is the application window from which the cropped application window 114 is generated.

Based on the selection of the application window 108, stored cropped application window settings or properties may be retrieved or accessed at optional operation 658. For instance, based on an identifier of the selected application window 108, such as a top-level window identifier (ID), prior generated cropped application window properties may be accessed. The application window identifier defines not only the application 112 of application window 108, but also state information for the application 112, such as a web page, scroll position, or other state information about what is being displayed by the application. A prior generated cropped application window that has been previously generated based on that application window identifier may then be accessed, and the properties set for that cropped application window may be accessed as well. The properties may include the settings for a prior crop region, the z-order position of the cropped application window 114, etc. Those properties may also be based on the window size and zoom amount for the prior application. The prior window size, zoom amount, and/or scroll position may be referred to as window size properties and may be stored with, or accessible with, the prior application window identifier. In some examples, no prior cropped application window has been generated for the window identifier, and in such cases, no prior cropped application window properties are accessed and operation 658 is omitted.

In some examples, the prior cropped application window properties may be accessed or retrieved locally from the same computing device 102 that is currently being used or remotely from a remote storage repository. For example, when a cropped application window 114 is generated, that cropped application window (or the properties defining that cropped application window) may be shared with others so that other users may generate corresponding cropped application windows on their computing devices 102. The shared cropped application window properties may be shared to a central database or repository where they may be accessed. The shared data structure may include the application window identifier, the cropped application window properties for the cropped application window generated from the corresponding application window 108, and/or the window sizing properties of the application window.

At operation 660, an initial crop region is displayed with crop options (e.g., crop handles 208) to adjust the crop region. For instance, an interface similar to that shown in FIG. 2C may be displayed. The initial crop region may be based on a default size for the crop region or may be based on the prior cropped application window properties if accessed in operation 658. For instance, the crop region used for the prior cropped application window may be used as the initial crop region in operation 660. The initial crop region may be adjusted based on differences in window property sizes of the currently selected application window 108 and the prior application window from which the prior cropped application window was generated.

At operation 662, adjustments to the crop region may be received via interactions with the crop options. At operation 664, a set of positions for the crop region may be displayed, and one of the positions may be selected. The positions may be a z-order position of the cropped application window, such as a frontmost position (e.g., always-on-top position) or a bottommost position (e.g., always-on-bottom position). Additionally or alternatively, a user interface type for where the cropped application window is to be displayed may be selected, such as a desktop UI 122, widgets dashboard 302, game bar 402, etc.

At operation 666, the cropped application window 114 is generated according to the adjusted crop region set in operation 662 and the position set in operation 664. Operations 668-672 can optionally occur when a user selection is made to reconfigure the cropped application window 114. At operation 668, a selection to reconfigure the cropped application window 114 is received. Such a selection may be of a recrop option 224 or similar option. Based on receiving the reconfiguration selection, the crop options, position options, and/or location options may be presented again to allow for the user to reconfigure the cropped application window. Reconfiguration parameters or adjustments are then received at operation 670 via the options. For instance, the crop region may be resized. At operation 672, the cropped application window 114 is regenerated based on the reconfiguration parameters or adjustments.

Figure 7:
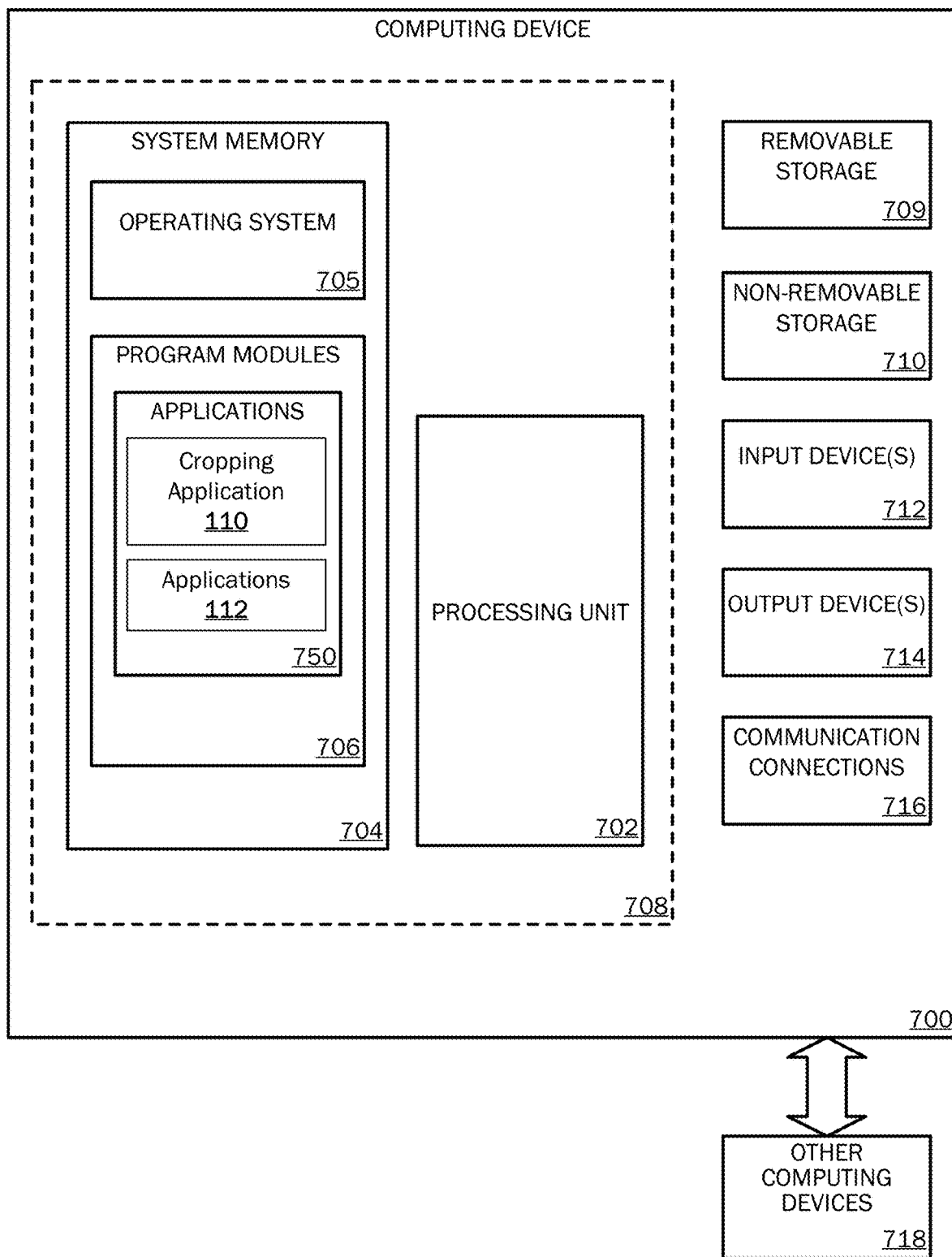
FIG. 7 is a block diagram illustrating example physical components of a computing device with which aspects of the invention may be practiced.
Figure 8A:
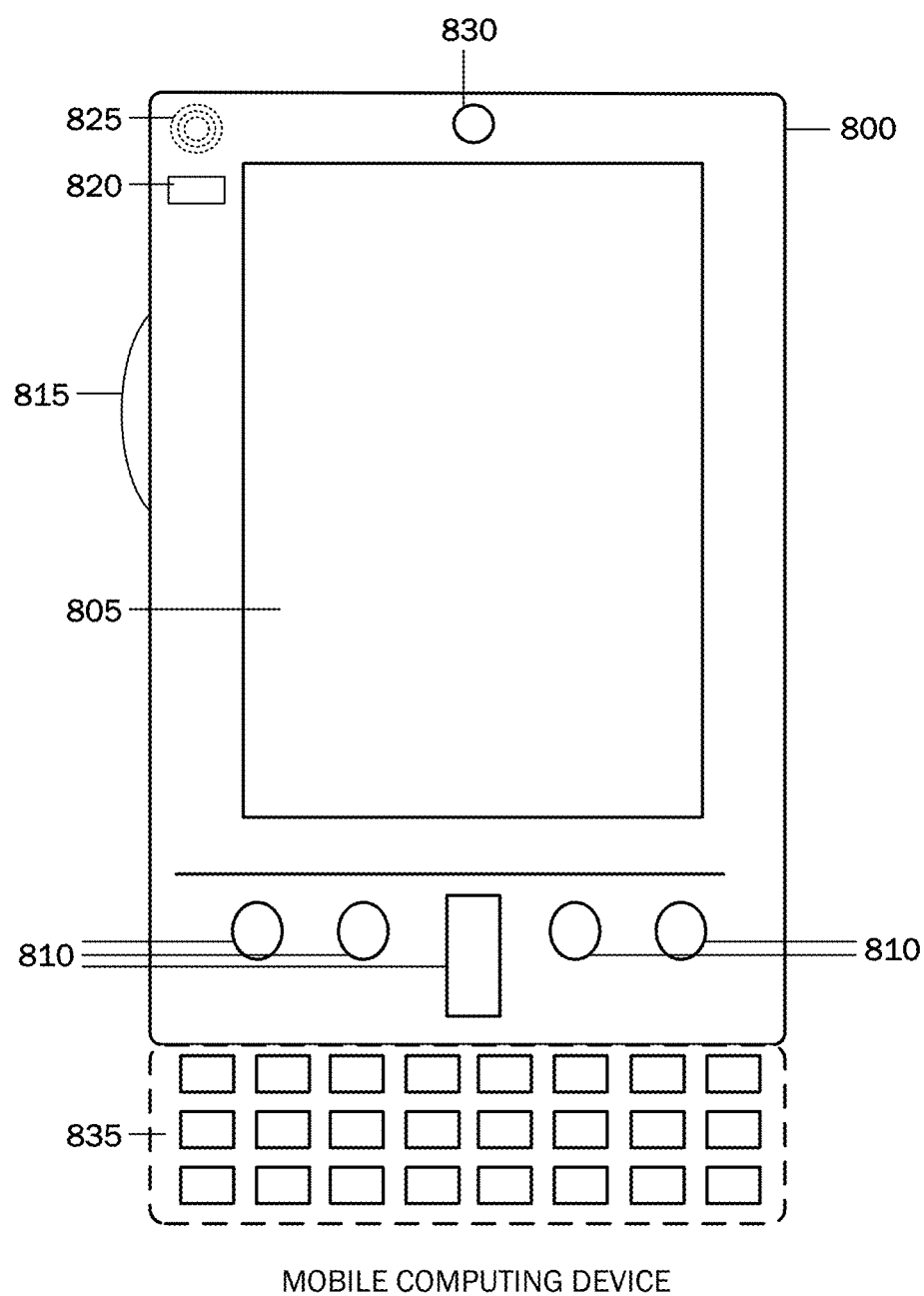
FIGS. 8A and 8B are simplified block diagrams of a mobile computing device with which aspects of the present invention may be practiced.
Figure 8B:
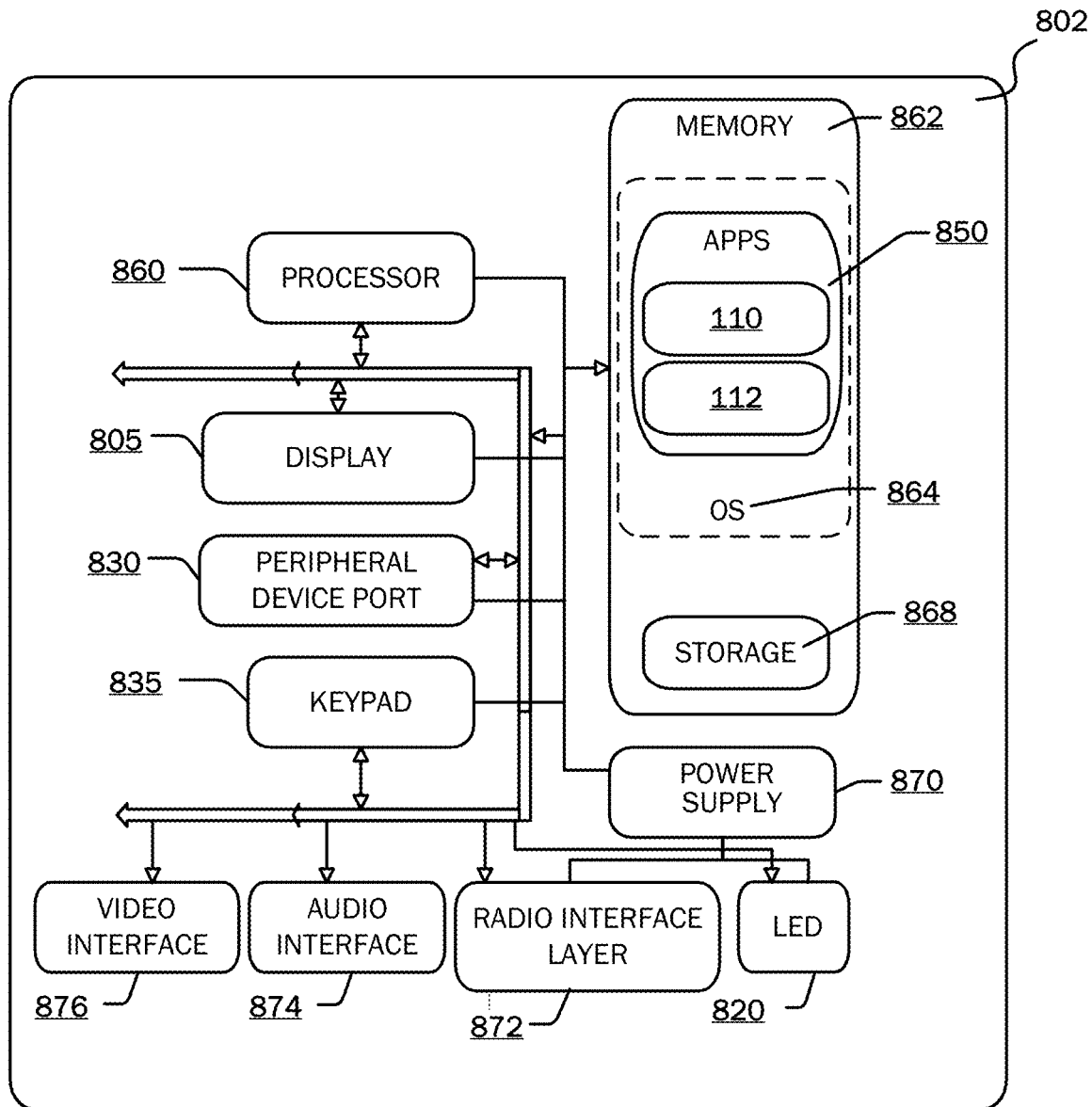

FIGS. 7, 8A, and 8B and the associated descriptions provide a discussion of a variety of operating environments in which examples of the invention may be practiced. However, the devices and systems illustrated and discussed with respect to FIGS. 7, 8A, and 8B are for purposes of example and illustration and are not limiting of a vast number of computing device configurations that may be utilized for practicing aspects of the invention, described herein.

FIG. 7 is a block diagram illustrating physical components (i.e., hardware) of a computing device 700 with which examples of the present disclosure may be practiced. The computing device components described below may be suitable for the computing device 102 described above. In a basic configuration, the computing device 700 may include at least one processing unit 702 and a system memory 704. Depending on the configuration and type of computing device 700, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750, such as the window cropping application 110 and other applications 112.

The operating system 705, for example, may be suitable for controlling the operation of the computing device 700. Furthermore, aspects of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the methods 600 and 650 illustrated in FIGS. 6A and 6B. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 700 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a mobile computing device 800, for example, a mobile telephone, a smart phone, a tablet personal computer, a laptop computer, and the like, with which aspects of the invention may be practiced. With reference to FIG. 8A, an example of a mobile computing device 800 for implementing at least some aspects of the present technology is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative examples, mobile computing device 800 may incorporate more or less input elements. For example, the display 805 may not be a touch screen in some examples. In alternative examples, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 can incorporate a system (i.e., an architecture) 802 to implement some examples. In one example, the system 802 is implemented as a "smart phone" capable of running one or more applications (e.g., videoconference or virtual meeting application, browser, e-mail, calendaring, contact managers, messaging clients, games, and media clients/players). In some examples, the system 802 is integrated as a computing device, such as an integrated personal digital assistant (PDA) and wireless phone.

One or more application programs 850 (e.g., the window cropping application 110 and other applications 112) may be loaded into the memory 862 and run on or in association with the operating system 864. Examples of the application programs 850 include videoconference or virtual meeting programs, phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at a remote device or server. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

The visual indicator 820 may be used to provide visual notifications and/or an audio interface 874 may be used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

As will be understood from the foregoing disclosure, many technical advantages and improvements result from the present technology. For instance, the present technology provides for significant improvement in screen real estate utilization by allowing for multiple applications, and specifically the useful parts of those applications, to be displayed. Further, because the switching back and forth between occluded application windows may no longer be necessary, the number of input/output exchanges due to moving application windows may also be reduced.

In an aspect, examples include a system for providing a cropped application window, the system comprising: at least one processor; and memory storing instructions that, when executed by the at least one processor, cause the system to perform operations comprising: receive a selection of an application window; in response to receiving a selection of an application window, provide crop options for selecting a crop region of the selected application window to be included in a cropped application window; receive an adjustment to the crop region; receive a selection for a position of the cropped application window; generate the cropped application window including a portion of the application window corresponding to the adjusted crop region; and display of the cropped application window in a user interface in the selected position.

In another aspect, examples include a method for providing a cropped application window, comprising: receiving a selection of an application window; in response to receiving a selection of an application window, providing crop options for selecting a crop region of the selected application window to be included in a cropped application window; receiving an adjustment to the crop region; receiving a selection for a position of the cropped application window; generating the cropped application window including a portion of the application window corresponding to the adjusted crop region; and displaying of the cropped application window in a user interface in the selected position.

In another aspect, examples include a method for providing a cropped application window, comprising: receiving a selection of an application window having an application window identifier; accessing cropped application window properties for a previous cropped application window generated for a prior application window having the application window identifier; displaying an initial crop region of the selected application window to be included in a cropped application window; receiving an adjustment to the crop region; receiving a selection for a position of the cropped application window; generating the cropped application window including a portion of the application window corresponding to the adjusted crop region; and displaying of the cropped application window in a user interface in the selected position.

Aspects of the present invention, for example, are described above with reference to block diagrams and/or operational illustrations of methods, systems, and computer program products according to aspects of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more examples provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the claimed invention.

I claim:

1. A system for providing a cropped application window, the system comprising:
   at least one processor; and
   memory storing instructions that, when executed by the at least one processor, cause the system to perform operations comprising:
      receive a selection of an application window;
      in response to receiving a selection of an application window, provide crop options for selecting a crop region of the selected application window to be included in a cropped application window;
      receive an adjustment to the crop region;
      receive a selection for a position of the cropped application window;
      generate the cropped application window including a portion of the application window corresponding to the adjusted crop region; and
      display of the cropped application window in a user interface in the selected position.

2. The system of claim 1, wherein the operations further comprise:
   provide, concurrently with the crop options, resize options for resizing at least one of the selected application window or content displayed in the application window.

3. The system of claim 2, wherein:
   the resize options include:
      resize handles; or
      a zoom level selector; and
   the operations further comprise:
      resize the application window based on user input received via the resize handles or the zoom level selector.

4. The system of claim 1, wherein the selected position is a frontmost z-order position, and displaying the cropped application window in the selected position includes displaying the cropped application window in the frontmost z-order position.

5. The system of claim 1, wherein the selected position is a bottommost z-order position, and displaying the cropped application window in the selected position includes displaying the cropped application window in the bottommost z-order position.

6. The system of claim 1, wherein the user interface includes one of:
   a desktop user interface;
   a widget dashboard; and
   a game bar user interface.

7. The system of claim 1, wherein operations further comprise:
   receive a selection to move the cropped application window; and
   in response to receiving the selection to move the cropped application window, move the cropped application window to another location in the user interface.

8. The system of claim 1, wherein the operations further comprise:
   provide a save option to save the cropped application window; and
   in response to receiving a selection of the save option, store information about the cropped application window.

9. The system of claim 1, wherein the operations further comprise:
   generate a title bar for the cropped application window, wherein the title bar includes a peek option;
   receive a selection of the peek option; and
   in response to receiving a selection of the peek option, display the entire application from which the cropped application window was generated.

10. A computer-implemented method for providing a cropped application window, the method comprising:
    receiving a selection of an application window;
    in response to receiving a selection of an application window, providing crop options for selecting a crop region of the selected application window to be included in a cropped application window;
    receiving an adjustment to the crop region;
    receiving a selection for a position of the cropped application window;
    generating the cropped application window including a portion of the application window corresponding to the adjusted crop region; and
    displaying of the cropped application window in a user interface in the selected position.

11. The method of claim 10, further comprising providing, concurrently with the crop options, resize options for resizing at least one of the selected application window or content displayed in the application window.

12. The method of claim 10, wherein the selected position is a frontmost z-order position, and displaying the cropped application window in the selected position includes displaying the cropped application window in the frontmost z-order position.

13. The method of claim 10, wherein the selected position is a bottommost z-order position, and displaying the cropped application window in the selected position includes displaying the cropped application window in the bottommost z-order position.

14. The method of claim 10, wherein the user interface includes one of:
    a desktop user interface;

a widget dashboard; and a game bar user interface.

15. The method of claim 10, further comprising generating a title bar for the cropped application window.

16. The method of claim 15, wherein the title bar includes at least one of a peek option or a recrop option.

17. A computer-implemented method for providing a cropped application window, the method comprising:

receiving a selection of an application window having an application window identifier;

accessing cropped application window properties for a previous cropped application window generated for a prior application window having the application window identifier;

displaying an initial crop region of the selected application window to be included in a cropped application window;

receiving an adjustment to the crop region;

receiving a selection for a position of the cropped application window;

generating the cropped application window including a portion of the application window corresponding to the adjusted crop region; and displaying of the cropped application window in a user interface in the selected position.

18. The method of claim 17, wherein the application window identifier indicates the application name and a current state of the application.

19. The method of claim 17, wherein the selected position is:

a frontmost z-order position, and displaying the cropped application window in the selected position includes displaying the cropped application window in the frontmost z-order position; or a bottommost z-order position, and displaying the cropped application window in the selected position includes displaying the cropped application window in the bottommost z-order position.

20. The method of claim 17, wherein the user interface includes one of:

a desktop user interface;

a widget dashboard; and a game bar user interface.

* * * * *